United States Patent

Bonnel et al.

[15] 3,656,985
[45] Apr. 18, 1972

[54] PORTLAND CEMENT COMPOSITION HAVING AN ACCELERATED SET

[72] Inventors: Bernard Bonnel, St. Cloud; Christian Hovasse, Decines, both of France

[73] Assignee: Progil, Paris, France

[22] Filed: Dec. 1, 1970

[21] Appl. No.: 94,157

[30] Foreign Application Priority Data

Dec. 2, 1969 France................................6941443

[52] U.S. Cl....................................106/90, 106/95, 106/315
[51] Int. Cl..........................................................C04b 13/24
[58] Field of Search............................106/90, 95, 314, 315

[56] References Cited

UNITED STATES PATENTS

| | | |
|---|---|---|
| 3,433,657 | 3/1969 | Pickering................................106/90 |
| 3,351,478 | 11/1967 | Dodson...................................106/90 |
| 3,053,674 | 9/1962 | Liberthson et al......................106/90 |
| 2,880,102 | 3/1959 | Woodard et al........................106/90 |
| 2,819,171 | 1/1958 | Scripture et al........................106/90 |
| 2,174,051 | 9/1939 | Winkler..................................106/90 |

*Primary Examiner*—Tobias E. Levow
*Assistant Examiner*—W. T. Scott
*Attorney*—Browdy & Neimark

[57] ABSTRACT

A composition for quickening the setting of Portland cement constituted by 0.5 – 5 parts of alkali aluminate and 0.05 – 2 parts of hydroxylated organic acid.

4 Claims, No Drawings

PORTLAND CEMENT COMPOSITION HAVING AN ACCELERATED SET

The present invention relates to a new composition for quickening the setting of a Portland cement or of a cement similar to Portland cement and use of the composition in the mortars and concretes in which this cement is incorporated.

Portland cement has tricalcium silicate for its main constituent, a slow setting material. Although workability and mechanical characteristics of mortars and concretes are sufficient after hardening, the beginning of setting and the setting time are, on the contrary, too long in many cases. Consequently, it is often necessary to favor a quick setting by addition of an accelerator which must not give rise to a decrease of other characteristics, up to unacceptable values, and which must not present corrosion hazard of the metal frames in contact with said cements.

Several substances are known as setting accelerators. Among them metal aluminates are especially interesting, but they have the disadvantage of making the mortars and concretes in which they are incorporated immediately rigid during tempering, which makes workability fall very quickly to zero and then does not offer anymore practical possibility of such compositions utilization. Moreover, mechanical characteristics are lowered after hardening. Additionally, it is known to use hydroxylated organic acids, their salts or esters as fluidifying agents and setting retardants.

The combined addition of metal aluminate and hydroxylated organic acid to Portland cement has already been recommended in U.S. Pat. No. 3,433,657 for the purpose of providing a protection coating for masonry surfaces. The claimed proportions are 80 parts of Portland cement per 10 to 50 parts of aluminate and 2 to 10 parts of hydroxylated acid. Such a composition cannot, however, be used as setting accelerator of mortars and concretes since the same would be not workable. Because of the high percentage of sodium aluminate, acid cannot play its fluidifying part and has only the moderate retardant character of aluminate. Consequently the application of such a mortar or concrete is not possible.

It has now been found that the composition constituted by the association of an alkali metal aluminate, a rigidifying agent and setting accelerator, with an hydroxylated organic acid, its salts or its esters acting as fluidifying agent and setting retardant, in weight proportions with regard to cement of 0.5 to 5 percent of alkali aluminate and 0.05 to 2 percent of hydroxylated organic acid, its salts or its esters, represents a convenient setting accelerator for Portland cement and any other cement having a high content in tricalcium silicate and for the mortars and concretes in which they are incorporated.

The used alkali metal aluminates are preferably the ones the ratio of which $Me_2O/Al_2O_3$ ranges between 1 and 2 (Me representing metal). However it is possible to use, without any disadvantage, aluminates in which the precited proportion is comprised between 1 and 4.

The hydroxylated organic acids are preferably tartaric, citric, gluconic, malic, lactic, salicylic acids, etc. or the salts of these acids, preferably alkali and alkaline earth metal salts and the esters of those acids in which acid or alcohol functions are esterified partly or wholly.

Practically the association of alkali metal aluminate and hydroxylated organic acid or derivatives is mixed with a product, such as precipitated silica, having no influence, at use amount, on the cement behavior; this product is introduced for preventing any moisture retention by the mixture. The additive formulated in this way is preferably dispersed in tempering water; it may also be added directly to cement or in the mortars and concretes during their manufacture.

In the numerous achieved tests, good characteristics were obtained using mortars and concretes made with Portland cement and a similar cement by adding the composition according to invention in proportions conveniently chosen in order to allow an application of those mortars and concretes in various fields of utilization. A large range of characteristics for mortars and concretes were obtained from a just sufficient workability with a combination of a very quick beginning and setting time, up to a good workability superior to that of a mortar containing no additive but however combined with a quickened beginning and setting time. Such mortars and concretes present in addition to good mechanical characteristics after complete hardening, but also no corrosion of the metal frames in contacts with them.

The following examples are given in a non-limitative way in order to illustrate the invention. These have been made by incorporating sodium aluminate, having a ratio $Na_2/Al_2O_3 = 1.2$, and various hydroxylated organic acids into mortars containing Portland cement, every mortar having the following constitution:

| | |
|---|---|
| sand according to French standard NF P 15 403 | 1,350 grams |
| artificial Portland cement | 450 grams |
| water | 225 grams |

Mortar fabrication was made according to the French standard NF P. 15 403. The additives were previously mixed with tempering water. Their proportions are given in weight percentages with regard to Portland cement.

In the table hereinunder spreading expresses mortar workability. This spreading is measured on a volume of mortar placed in a truncated cone which is submitted to 15 successive shakings (flow test method); it is expressed by the difference in centimeters between the diameter of spread mortar and that of the cone trunk basis which is 8 centimeters. A blank mortar without any additive has, generally, a spreading of between 3.5 and 4.5 cms.

Measures of mortar setting have been made with Vicat's needle according to the French standard NF P. 15 431.

Compression resistance was measured on prismatic samples (4×4×16 cms) according to the French standard NF P. 15 401.

The obtained results are given in the following Tables 1 and 2.

TABLE 1

| Example | Sodium aluminate, percent | Tartaric acid, percent | Spreading (cm.) | Setting beginning | Setting end |
|---|---|---|---|---|---|
| 1 | 0 | 0 | 4.1 | 4 h. 30' | 6 h. |
| 2 | 1 | 0 | 0 | 30' | 1 h. 30' |
| 3 | 1 | 0.05 | 0.2 | 45' | 2 h. 10' |
| 4 | 1 | 0.3 | 0.8 | 3 h. 15' | 5 h. 30' |
| 5 | 1.5 | 0 | 0 | 15' | 30' |
| 6 | 1.5 | 0.4 | 3 | 45' | 1 h. 30' |
| 7 | 1.5 | 0.4 | 4.3 | 1 h. | 1 h. 40' |
| 8 | 2 | 0 | 0 | 10' | 17' |
| 9 | 2 | 0.2 | 3.9 | 1 h. | 1 h. 35' |
| 10 | 2 | 0.75 | 4.3 | 2 h. 30' | 4 h. 20' |
| 11 | 2 | 1.75 | 3.4 | 2 h. 45' | 4 h. 45' |
| 12 | 3 | 0.8 | 6 | 2 h. 30' | 4 h. |

| Example | Sodium aluminate, percent | Diethyl tartrate, percent | Spreading (cm.) | Setting beginning | Setting end |
|---|---|---|---|---|---|
| 13 | 1.5 | 0.05 | 1 | 24' | 34' |
| 14 | 1.5 | 0.2 | 2.8 | 1 h. 10' | 2 h. 20' |
| 15 | 1.5 | 0.5 | 2.9 | 2 h. 50' | 3 h. 50' |

| Example | Sodium aluminate, percent | Sodium and potassium tartrate, percent | Spreading (cm.) | Setting beginning | Setting end |
|---|---|---|---|---|---|
| 16 | 2 | 0.2 | 1.1 | 45' | 1 h. 20' |
| 17 | 2 | 0.8 | 2.2 | 1 h. 50' | 2 h. 45' |
| 18 | 2 | 1.6 | 5.7 | 2 h. 20' | 3 h. 20' |

TABLE 2

| Example | Sodium aluminate, percent | Citric acid, percent | Spreading (in cm.) | Setting beginning | Setting end |
|---|---|---|---|---|---|
| 19 | 1.5 | 0.1 | 0.2 | 19' | 28' |
| 20 | 1.5 | 0.3 | 0.6 | 23' | 38' |
| 21 | 1.5 | 0.6 | 0.8 | 20' | 35' |
| 22 | 1.5 | 1 | 3.1 | 1 h. | 1 h. |
| 23 | 1.5 | 1.5 | 1.9 | 45' | 1 h. 10' |

TABLE 2—Continued

| Example | Sodium aluminate, percent | Citric acid, percent | Spreading (in cm.) | Setting beginning | Setting end |
|---|---|---|---|---|---|
| 24 | 1.5 | 0.1 | 0.9 | 12' | 30' |
| 25 | 1.5 | 0.2 | 1.8 | 2 h. 40' | 6 h. 30' |
| 26 | 1.5 | 0.5 | 4.5 | 3 h. 40' | 7 h. |
| 27 | 1.5 | 0.6 | 6.6 | 3 h. 20' | 7 h. 15' |

| Example | Sodium aluminate, percent | Malic acid, percent | Spreading (in cm.) | Setting beginning | Setting end |
|---|---|---|---|---|---|
| 28 | 1.5 | 0.5 | 0.6 | 19' | 30' |
| 29 | 1.5 | 1 | 0.9 | 25' | 40' |

| Example | Sodium aluminate, percent | Lactic acid, percent | Spreading (in cm.) | Setting beginning | Setting end |
|---|---|---|---|---|---|
| 30 | 1.5 | 0.5 | 0.5 | 22' | 42' |
| 31 | 1.5 | 1 | 0.7 | 23' | 50' |
| 32 | 1.5 | 2 | 1 | 35' | 50' |

| Example | Sodium aluminate, percent | Salicylic acid, percent | Spreading (in cm.) | Setting beginning | Setting end |
|---|---|---|---|---|---|
| 33 | 1.5 | 0.05 | 0.4 | 22' | 43' |
| 34 | 1.5 | 0.5 | 4.3 | 15' | 40' |
| 35 | 1.5 | 1 | 2.3 | 30' | 45' |

The different tests conducted show that tartaric acid is the best performing acid among the different organic hydroxylated acids because it provides both an improved workability of the mortar to which it is added with alkali metal aluminate and a moderated retarded rate of setting. The other acids allow either a lower workability and a quicker setting beginning and time, or a reasonable workability but a retarded setting. However, they can be used according to their performances more particularly in quick setting mortars which have a small workability. In this case the metal aluminate acts as a powerful accelerator of setting; the employed acid cannot act as a retarder, but has a sufficient fluidifying effect to give the mortar the useful workability during the short time it can be employed.

The compression strength for the mortar containing no additive is of 178 kg/cm$^2$ after remaining for 2 days, 341 kg/cm$^2$ after remaining for 7 days and 415 kg/cm$^2$ after remaining for 28 days. For a mortar containing 1.5 percent sodium aluminate and 0.6 percent tartaric acid said strength is 170 kg/cm$^2$ after 2 days, 348 kg/cm$^2$ after 7 days and 512 kg/cm$^2$ after 28 days.

The combination of sodium aluminate and carboxylic hydroxylated acid has a non-corrosive effect on metallic surfaces, which is very important. If the aqueous solution of aluminate is not corrosive, the solutions of the different acids corrode the metallic surfaces very quickly. It has been noticed that the different solutions containing the mixture of the two components according to the above tables had no corrosive effect on metals. The presence of alkali metal aluminate prevents the corrosion usually produced by the acid.

Finally, this combination has very remarkable performances when it is used at low temperatures. Thus, a mortar based on Portland cement containing 1.05 percent of sodium aluminate and 0.4 percent of tartaric acid (by weight based on the cement) mixed at about 0° C. and maintained at the same temperature, has a beginning of setting which occurs after remaining for 1 h. 20 minutes and an end of setting occuring after remaining for 1 h. 45 minutes, whereas a mortar of same composition without any additive has a beginning and an end of setting which occur after remaining for 7 hours and for 15 hours, respectively. The compression strengths of the mortars containing the mixture according to the invention, under these conditions of low temperature, are also improved, compared to a mortar without an additive, as well as with a mortar containing calcium chloride, which is an accelerator of setting for mortars and cements that remain at a cold temperature. Thus samples provided and maintained for 24 hours at 4° C., then at −5° C. have the following compression strengths:

Mortar without an additive:
 45 kg/cm$^2$ after remaining for 2 days,
 115 kg/cm$^2$ after remaining for 7 days, and
 187 kg/cm$^2$ after remaining for 28 days.

Mortar containing 2 percent of calcium chloride (in parts by weight, based on the cement):
 85 kg/cm$^2$ after remaining for 2 days
 171 kg/cm$^2$ after remaining for 7 days and
 179 kg/cm$^2$ after remaining for 28 days Mortar containing 1.05 percent of sodium aluminate and 0.4 percent of tartaric acid (in parts by weight, based on the cement)
 114 kg/cm$^2$ after remaining for 2 days
 260 kg/cm$^2$ after remaining for 7 days and
 304 kg/cm$^2$ after remaining for 28 days The mixture according to the invention can be used successfully to obtain quick setting mortars, in usual concretes, in reinforced concrete, in road concretes in concretes for prefabrication, in prestressed concretes, cement slurries to be injected in known manner, all these compositions containing either Portland cement or another cement with a high amount of tricalcium silicate.

It will be obvious to those skilled in the art that various changes may be made without departing from the scope of the invention and the invention is not to be considered limited to what is described in the specification.

What is claimed is:

1. A Portland cement composition having an accelerated set, which consists essentially of said cement and 0.5 to 5 percent of alkali metal aluminate and 0.05 to 2 percent of an hydroxylated organic acid, its salt or its ester, by weight based on said cement.

2. Composition according to claim 1 in which said aluminate has a ratio $MeO_2/Al_2O_3$ comprised between 1 and 4, wherein Me is an alkali metal.

3. Composition according to claim 2 wherein said ratio is 1 to 2.

4. Composition according to claim 1 in which hydroxylated organic acid is selected from the group consisting of tartaric, citric, gluconic, malic, lactic and salicylic acids.

* * * * *